United States Patent
Tanaka (10) Patent No.: US 7,718,971 B2
(45) Date of Patent: May 18, 2010

(54) NUCLEAR MEDICINE IMAGING APPARATUS AND A METHOD FOR GENERATING IMAGE DATA

(75) Inventor: Takashi Tanaka, Tochigi-ken (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 250 days.

(21) Appl. No.: 11/549,509

(22) Filed: Oct. 13, 2006

(65) Prior Publication Data

US 2007/0096028 A1 May 3, 2007

(30) Foreign Application Priority Data

Oct. 13, 2005 (JP) ............................. 2005-298717

(51) Int. Cl.
*G01T 1/161* (2006.01)
*G01T 1/164* (2006.01)

(52) U.S. Cl. .............................. 250/363.07; 250/363.03

(58) Field of Classification Search ............ 250/363.03, 250/363.05, 363.07, 363.09
See application file for complete search history.

(56) References Cited

U.S. PATENT DOCUMENTS

| 5,703,369 A * | 12/1997 | Mori ..................... 250/363.03 |
| 6,239,438 B1 * | 5/2001 | Schubert ................ 250/363.03 |
| 7,154,096 B2 * | 12/2006 | Amano .................. 250/363.03 |
| 7,282,723 B2 * | 10/2007 | Schomacker et al. ..... 250/458.1 |

FOREIGN PATENT DOCUMENTS

JP 2002-090458 3/2002

* cited by examiner

*Primary Examiner*—David P Porta
*Assistant Examiner*—Faye Boosalis
(74) *Attorney, Agent, or Firm*—Oblon, Spivak, McClelland, Maier & Neustadt, L.L.P.

(57) ABSTRACT

The present invention provides a nuclear medicine imaging apparatus and image data generation method that achieves restarting of the generation of projection data and at an early stage while monitoring a variation of count values for detecting an occurrence of non-permissible body movement of a patient. The image processing apparatus consistent with the present invention detects a pair of gamma-rays successively emitted from an object with a radioactive isotope through a pair of detector modules in a data detecting unit. A data processing unit and an incident direction calculating unit in the image processing apparatus respectively calculate a gamma-ray detection position and a gamma-ray incident direction based on the acquired detection signals. A projection data generating unit in the apparatus generates monitoring projection data based on each count value of the detection signals in correspondence to the gamma-ray detection position and the gamma-ray incident direction. A projection data monitoring unit calculates a body movement index of the object by comparing count values of the monitoring projection data that are generated in each of two preferably adjoining monitoring periods. A system control unit generates an alarm signal for performing repetition of the monitoring projection data when the body movement index exceeds a threshold value and displays the alarm signal on a display unit.

21 Claims, 8 Drawing Sheets

NUCLEAR MEDICINE IMAGING APPARATUS AND A METHOD FOR GENERATING IMAGE DATA

CROSS-REFERENCE TO RELATED APPLICATIONS

This application claims priority from, and the benefit of, Japanese Patent Application No. 2005-298717, filed on Oct. 13, 2004, the contents of which are expressly incorporated herein by reference in their entirety.

BACKGROUND OF THE INVENTION

A. Field of the Invention

The present invention relates to a nuclear medicine imaging apparatus and a method for displaying image data thereof, and more particularly, to a positron emission computer tomography (PET) apparatus and a method for displaying image data thereof that can automatically restart data collection of image data by detecting impermissible body movement of an object during the image data collection.

B. Background of the Invention

Recent developments of computer technologies have rapidly progressed medical imaging apparatus, such as an X-ray diagnosis apparatus, a magnetic resonance imaging (MRI) apparatus, an X-ray computer tomography (CT) apparatus and a nuclear medicine imaging apparatus. A nuclear medicine imaging apparatus can display distribution image data of a radioactive isotope in an object by detecting gamma-rays emitted from the object injected with the radioactive isotope.

X-ray diagnosis apparatus and X-ray CT apparatus are usually aimed for use in a so-called morphology diagnosis involving displaying images of profile of internal organs or tumors in an object. On the contrary, a nuclear medicine imaging apparatus is used for a faculty diagnosis of an object through imaging a dosage distribution by measuring gamma-rays emitted from a radioactive isotope that has been selectively introduced into organs of a living body or is emitted from a marked medicine by a radioactive isotope.

As a nuclear medicine imaging apparatus for a clinical diagnosis, a gamma camera, a single photon emission CT (SPECT) apparatus or a positron emission computer tomography (PET) apparatus are usually used.

A gamma camera includes a plane detector facing an object in order to display a distribution of radioactive isotope projected on the plane detector as a two-dimensional image by measuring gamma-rays emitted from an object. The gamma camera specifies incident directions of a gamma ray into the plane detector through a collimator that is provided in front of the plane detector.

A SPECT apparatus also provides a similar plane detector in a gamma camera, in which a plane detector is moved around an object or a plurality of plane detectors are moved around an object. In the SPECT apparatus, image data are generated by performing a reconstruction process similar to that used in an X-ray CT apparatus based on detected gamma-ray data of single photon emitted in a plurality of directions from an object.

A PET apparatus detects a pair of gamma-rays emitted from an object through a ring-like detector that is provided around an object in order to generate image data by performing a reconstruction process of the gamma-rays detected through the detector. Usually, an object is administered (injected) with a medicine marked with a nuclide so as emit positrons before the object is placed into the PET apparatus. During data collection in the PET apparatus, a pair of gamma-rays is emitted in almost opposite directions when a positron couples with an electron. Usually, each of a pair of gamma-rays is 511 keV (kilo-electron volts). The pair of gamma-rays emitted from an object is detected through the ring-like detector.

The SPECT apparatus includes two-dimensional detectors and the PET apparatus includes a plurality of ring-like detectors. Each of these detectors is comprised of a plurality of scintillators for converting each gamma-ray to light and a plurality of photomultipliers (PMTs) for amplifying the light and for converting the light into electrical signals. For instance, Japanese Patent Application Publication 2002-90458 suggests performing an image reconstruction process by using the count value of gamma-rays detected by a detector module during a prescribed time as projection data.

To generate image data through a nuclear medicine imaging apparatus, a doctor or an examination engineer (hereinafter referred to as an operator) needs to collect projection data from a wide diagnosis area over an object by and to perform an image reconstruction process of the collected projection data. For the projection data used in the reconstruction process, count values of gamma-rays that are detected through the detector during a prescribed data collecting period (hereinafter simply referred to as a data collecting period) are used. Usually, in PET apparatus, a data collecting time for a predetermined diagnosis portion $\Box Z$ along a body axis of an object is about two minutes. Accordingly, to collect project ion data in a wide scope of diagnosis, the detector is moved step by step over a predetermined scope by the predetermined diagnosis portion $\Box Z$. For instance, if it is required s to move the detector by 10 steps for collecting projection data for a required diagnosis scope, it takes more than twenty minutes.

Consequently, the patient may move his body during such a long data collecting time for a wide diagnosis area of an object. When a patient moves his body during such a data collecting time (hereinafter, simply, "a body movement "has occurred), a problem in the image quality of image data being generated based on such projection data conventionally occurred. Thus, image quality deteriorates due to body movement. When an operator observes such image deterioration due to body movement after finishing reproduction of image data, the collection of projection data needs to be restarted from an initial step in order to generate image data and to execute a reconstruction process based on the recollected projection data.

Consequently, data collection takes longer due to the need for restarting image data generation. This seriously reduces examination efficiency and it also imposes a great deal of physical burden both on the patient and operator. Moreover, if a radioactive isotope has a rather short radioactive half-life, if the radioactive isotope needs to be administered again into a patient, a total amount of radioactive contamination for a patient seriously increases due to restart of projection data. These are serious problems in a conventional PET apparatus.

The present invention is capable of solving the above-mentioned problems and defects of the conventional nuclear image processing apparatus. The present invention provides a PET imaging apparatus and an image generation method thereof that can restart a collection of projection data at an early stage when a non-permissible body movement occurs. Thus, a PET imaging apparatus consistent with the present invention detects such body movement by monitoring a variation of count values of gamma-rays emitted from a patient who has been administered a radioactive isotope.

SUMMARY OF THE INVENTION

According to one embodiment of the present invention, a positron emission computer tomography (PET) imaging apparatus is configured to detect gamma-rays emitted from a predetermined diagnosis portion of an object with a radioactive isotope, and to generate a distribution image of the radioactive isotope in the object based on the detected gamma-ray data, the PET imaging apparatus comprising:

a direction calculating unit configured to acquire emitting directions of the gamma rays based on the detected gamma-rays data;

a first time counting unit configured to acquire each count value of the gamma rays for each emission in a first time period;

a second time counting unit configured to acquire each count value of the gamma rays for each emission in a second time period; and an operation unit configured to acquire the sum of; and a judging unit configured to judge whether a body movement has occurred based on a difference between the count value in the first time period and the count value in the second time period for the respective output from the first time counting unit and the second time counting unit.

According to another embodiment of the present invention, the nuclear medicine imaging apparatus consistent with the present invention is configured so as to detect gamma-rays emitted from a predetermined portion of an object with a radioactive isotope, and includes:

a data detection unit configured to detect gamma-rays emitted from a predetermined portion in the object;

a detection position calculation unit configured to calculate each position of the detected gamma-ray in the data detection unit;

an incident direction calculation unit configured to calculate each incident direction of the incident direction in the data detection unit;

a projection data generating unit configured to generate a plurality of monitoring projection data in a time series by storing each count value of each detection signal being successively obtained through the data detection unit in corresponded to each detection position of the gamma-ray and each incident direction of the gamma-ray;

a projection data monitoring unit configured to monitor time changes of the count values of the projection data being monitored;

a projection data generation control unit configured to control regenerate monitoring projection data to the predetermined portion of the object based on a monitoring result of the projection data monitoring unit; and an image data generation unit configured to generate image data by performing a reconstruction process of projection data based on the plurality of monitoring projection data acquired by regenerating data.

An embodiment of a method for generating image data for a PET imaging apparatus, comprises:

detecting gamma rays emitted from a predetermined diagnosis portion of an object with a radioisotope;

calculating an incident direction of the gamma ray to the detector based on the detected gamma rays data;

acquiring a first count value of gamma rays for the respective incident directions to the detector during a first time period;

acquiring a second count value of gamma rays for the respective incident directions to the detector during a second time period;

judging whether a body movement of the object has occurred based on a difference between the first count value in the first time period and the second count value in the second time period; and generating a distribution image of the radioisotope in the object based on the judging.

According to a nuclear medicine imaging apparatus and a method for generating image data consistent with the present invention, when projection data are generated based on count values emitted from an object (patient) who has been administered with a radioactive isotope, it become possible to body movement of the object by monitoring changes of count values in a predetermined time period. When non-permissible body movements have occurred, it can restart generation of projection data in an early time. Consequently, it can improve examination efficiency and also can reduce burdens for the object and/or operators.

BRIEF DESCRIPTION OF THE DRAWINGS

The accompanying drawings, which are incorporated in and constitute part of this specification, illustrate various embodiments and/or features of the present invention, and together with the description, serve to explain the present invention. Where possible, the same reference number will be used throughout the drawings to describe the same or like parts. In the drawings.

DESCRIPTION OF THE PREFERRED EMBODIMENTS

With reference to the following FIGS. 1-8, embodiments consistent with the present invention will be explained. As an exemplary embodiment according to the nuclear medicine imaging apparatus consistent with the present invention, it will be explained as to a PET apparatus. Of course, the present invention is applicable to nuclear medicine imaging apparatus for other image diagnosis apparatus, such as a SPECT apparatus or a composite type PET apparatus with an X-ray CT apparatus.

An object (patient) has previously been administered (injected) a radioactive isotope before being positioned into a nuclear medicine imaging apparatus consistent with the present invention. In the nuclear medicine imaging apparatus, during a prescribed monitoring time period, a pair of gamma-rays emitted from a diagnostic portion in the patient with the radioactive isotope is successively detected by a detector of a ring-like configuration that is comprised of a plurality of detector modules. Based on the respective count values of the detected gamma-rays, projection data (hereinafter simply referred to as monitoring data) are generated for use in a monitoring operation in conformity with a detected position of a gamma-ray in the detector module and an incident direction of the gamma-ray to the detector.

Further, against the same diagnostic portion, detection of the gamma-rays and the generation of monitoring data in the monitoring period are successively repeated a plural number of times in order to calculate an index that indicates an amount of body movement of a patient (hereinafter simply referred to as "a body movement index"). The body movement index is calculated by comparing between count values of monitoring data that are obtained in two adjoining monitoring periods. If the body movement index indicates a bigger value than a predetermined threshold value, an alarm signal is displayed on a display unit of the apparatus. Based on the alarm signal, an operator restarts the detection of gamma-rays and generation of monitoring data in accordance with an inputted command signal.

If there is no display of an alarm signal or no input of a command signal, collecting operations of the monitoring data in the above-mentioned monitoring period would be repeated a plural number of times during a predetermined data collecting period. Each count value of the monitoring data obtained in each of the plural monitoring periods is integrated with each of a gamma-ray detected position and a gamma-ray incident direction in order to generate projection data. Image data is generated by performing a reconstruction process using the generated projection data.

Figure 1:
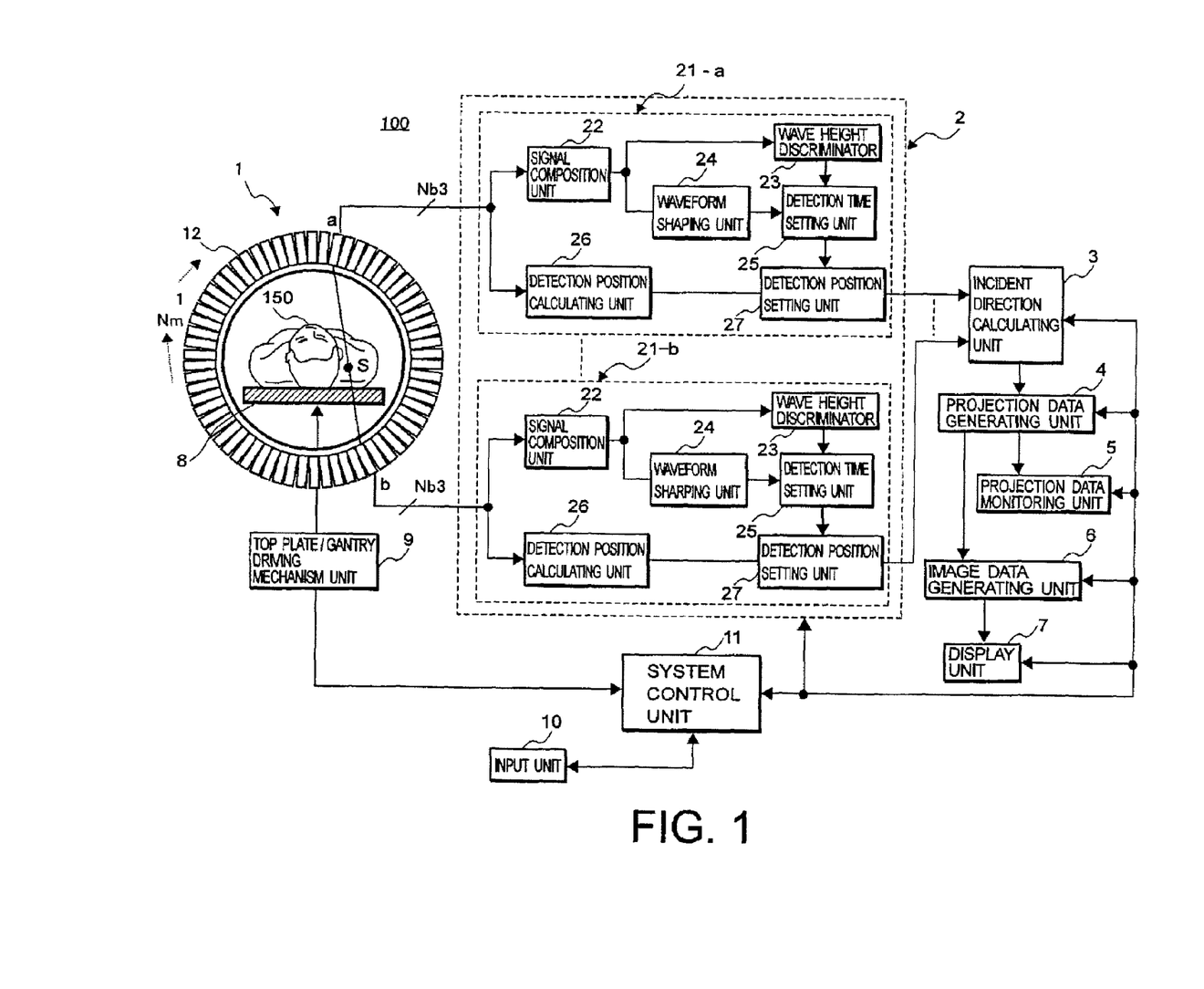
FIG. 1 is a block diagram illustrating a construction of a nuclear medicine imaging apparatus consistent with the present invention.
Figure 2:
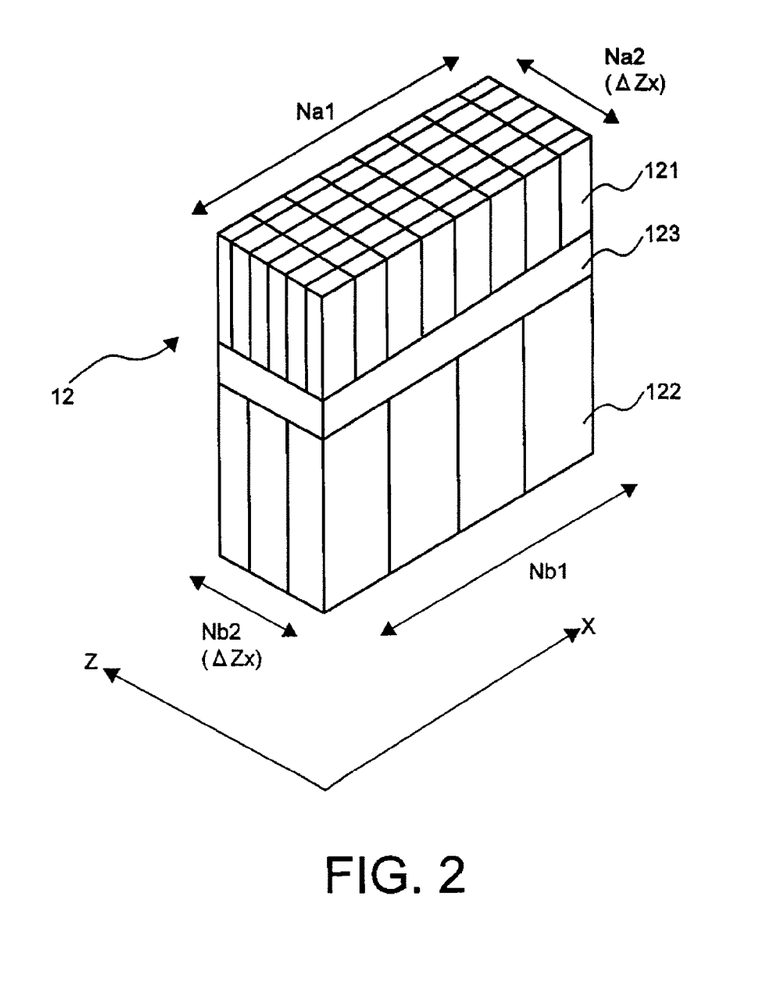
FIG. 2 illustrates a construction of a detector module used in the embodiment shown in FIG. 1.

With reference to FIGS. 1 to 5, a construction of an embodiment of a nuclear medicine imaging apparatus consistent with the present invention will be explained. FIG. 1 is a block diagram illustrating a whole construction of a nuclear medicine imaging apparatus of an embodiment according to this invention. FIG. 2 illustrates a construction of a detector module provided in the nuclear medicine imaging apparatus.

As shown in FIG. 1, nuclear medicine imaging apparatus 100 includes a data detection unit 1 that is comprised of a plurality of detector modules 1 to Nm provided in a ring-like configuration, a data processing unit 2 configured to process detection data from each detector module in data detecting unit 1, an incident direction calculating unit 3 configured to calculate incident directions of gamma-rays using detection signals from data processing unit 2, a projection data generating unit 4 and a projection data monitoring unit 5. Data detecting unit 1 is provided in a ring-like configuration around a patient 150 who has been administered with a radioactive isotope (RI) in order to detect a pair of gamma-rays emitted from the patient 150. Data processing unit 2 includes a plurality of data processing units 21-1 to 21-Nm corresponding to each of the plurality of detector modules 1 to Nm. Data processing unit 2 discriminates gamma-rays detected in the data detecting unit 1 from noise. Further it sets the respective detection position and detection time for the pair of gamma-rays. Incident direction calculating unit 3 extracts a pair of gamma-rays which are simultaneously detected and calculates gamma-ray incident directions based on the pair of gamma-ray detecting positions. Projection data generating unit 4 successively stores each count value of gamma-rays in a predetermined period as to each of the pair of gamma-ray detecting positions and each of the gamma-ray incident directions in order to generate monitoring data and projection data. Projection data monitoring unit 5 calculates a body movement index by comparing among count values of monitoring data which are generated in each of adjoining monitoring periods.

Nuclear medicine imaging apparatus 100 is further comprised of an image data generating unit 6, a display unit 7, a top plate 8, a top plate/gantry driving mechanism unit 9, an input unit 10 and a system control unit 11. Image data generating unit 6 generates image data by performing a reconstruction process of projection data generated in the projection data generating unit 4. Display unit 7 displays the generated image data. Object (patient) 150 is placed on top plate 8. Top plate/gantry driving mechanism unit 9 moves a gantry (not shown) provided on the data detecting unit 1 or the top plate 8 along a body axis direction of the patient 150. Input unit 10 (described in more detail below) allows projection data generating conditions and input operations of various command signals to be set. System controlling unit 11 controls each of the above-mentioned units.

Data detecting unit 1 includes a plurality of detector modules 12-1 to 12-Nm which are provided as a ring-like configuration. A patient (object) 150 lying on the top plate 8 is inserted at a center portion of the detector ring. Gamma-rays emitted from the patient 150 are once converted to visible radiations through each of the detector modules 12-1 to 12-Nm and then converted to detection signals. Thus, the gamma-rays emitted from a diagnostic portion are detected.

FIG. 2 shows a practical construction of each of the plurality of detector modules 12-1 to 12-Nm provided in a ring-like arrangement. Each detector module 12 includes strip frames of Na1 pieces arranged in a ring-like direction and Na2 pieces arranged in a body axis direction. Each detector module 12 further includes a plurality of scintillators 121 for detecting each gamma-ray and converting it to visible radiation. The plurality of scintillators 121 is comprised of Nb1 pieces arranged in a ring-like direction and Nb2 pieces arranged in a body axis direction. Visible radiations converted in the scintillators 121 are converted to electric signals and also amplified in a plurality of multiplier photoelectron tubes 122. Each detector module 12 further includes a light guide 123 for transmitting visible radiation emitted from each scintillator 121 to each multiplier photoelectron tube 122.

In the embodiment shown in FIG. 2, for easy understanding, the number of scintillators 121 is shown as eight (8) pieces of Na 1frames arranged in a ring-like direction and 6 pieces of Na 2 frames arranged in body axis direction. The number Nb1 of multiplier photoelectron tube is shown as four (4) and the number of Nb2 of multiplier photoelectron tube is shown as three (3). Of course, the invention is not limited to these numbers.

As materials for the scintillator 121, for example, bismuth germanide (BGO: $Bi_4Ge_3O_{12}$), thallium activated sodium iodide (NaI(Tl)), barium fluoride ($BaF_2$) are usually used. In particular, for a PET apparatus, it is preferable to use a scintillator material that has a high photoelectric absorption rate such as $Bi_4Ge_3O_{12}$ or a scintillator material that has a quick response speed such as $BaF_2$.

Each multiplier photoelectron tube 122 includes a photocathode and an electron multiplier. For example, the tube amplifies several hundreds of photons into $10^7$ to $10^{10}$ of electrons. The multiplier photoelectron tube collects these electrons at an anode at an output stage and converts it to an electrical signal. A multi-alkali substance having a wavelength characteristic that is substantially the same as a luminescence wavelength of the scintillator 121 or a bi-alkali potassium substance being activated by oxygen or cesium is used as the photocathode. Generally, 20 to 30 percent of photoelectrons are generated from the total number of incidence photons.

The electron multiplier tube is comprised of multi-staged electrodes which are arranged along transmitting paths of electrons based on secondary electron discharge phenomenon and anodes for collecting amplified electrons. In case that a tube voltage is set at 200V (volts) to 300V, an amplifying ratio of one stage becomes about five times. Consequently, about ten (10) stages of electrodes are usually provided in order to acquire the above-mentioned amplifying ratio of $10^7$.

Light guide 123 optically couples scintillator 121 and multiplier photoelectron tube 122. To efficiently transmit visible radiation outputted from scintillator 121 to multiplier photoelectron tube 122, a plastic material having an effective light transmittance is usually used as a light guide 123.

Turning to FIG. 1, data processing unit 2 includes a plurality of data processing units 21-1 to 21-Nm, each of which is respectively coupled to one of the plurality of detector modules 12-1 to 12-Nm. For easy understanding, suppose that a pair of gamma-rays emitted from a radioactive isotope S being administrated in an object body 150 is detected by a pair of detector modules 12-a and 12-b. Thus, in FIG. 1, only a single pair of data processing units 21-a and 21-b that is respectively connected to the pair of a detector modules 12-a and 12-b is illustrated in the data processing unit 2.

Each of the data processing units 21-a and 21-b respectively includes a signal composition unit 22 configured to additionally compose detection signals of three Nb 3 (Nb 3=Nb 1×Nb 2) channels supplied from multiplier photoelectron tube 122 in the detector module 12-a, a wave height discriminator 23 configured to discriminate between detection signals and noise due to radiation of gamma-rays by using detection signals composed in the signal composition unit 22, a waveform shaping unit 24 configured to shape the composed detection signals outputted from the signal composition unit 22 into a rectangular wave and a detection time setting unit 25 configured to measure a gamma-ray detection time based on, for example, a front edge of the rectangular wave and also to add the gamma-ray detection time to the detection signals discriminated in the wave height discriminator 23.

Each of data processing units 21-1a and 21-b includes a detection position calculating unit 26 configured to calculate gamma-ray detection positions at the detector module 12 based on detection signals of three Nb 3 channels supplied from the multiplier photoelectron tubes 122 and a detection position setting unit 27 configured to add the gamma-ray detection position to detection signals being set a gamma-ray detection time in the detection time setting unit 25.

Figure 3A:
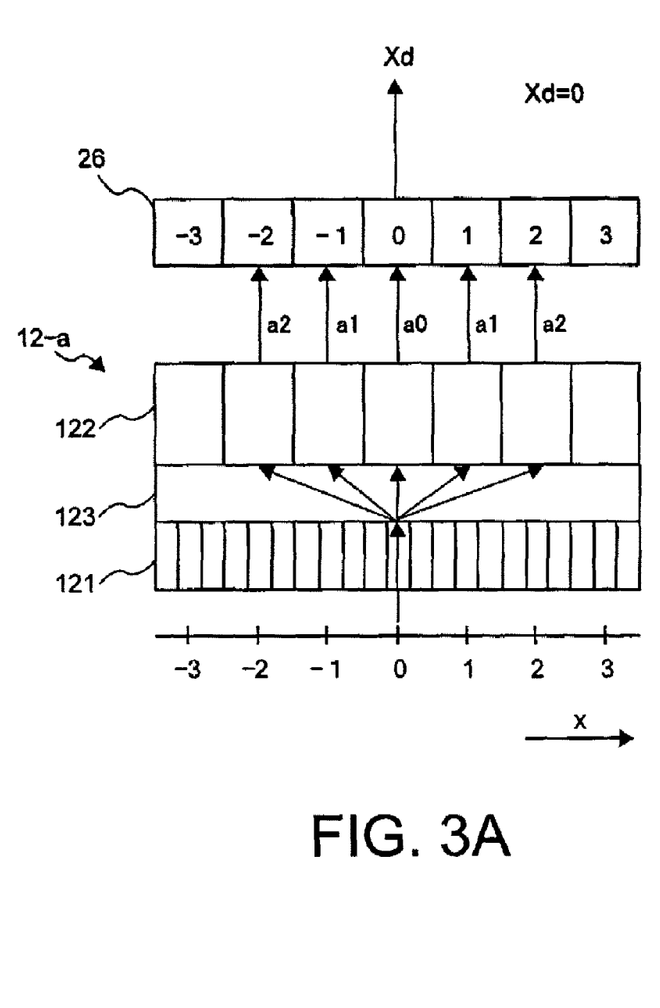
FIGS. 3A and 3B explain functions of a signal composition unit and a detection position calculating unit in a data processing unit in the embodiment shown in FIG. 1, respectively.
Figure 3B:
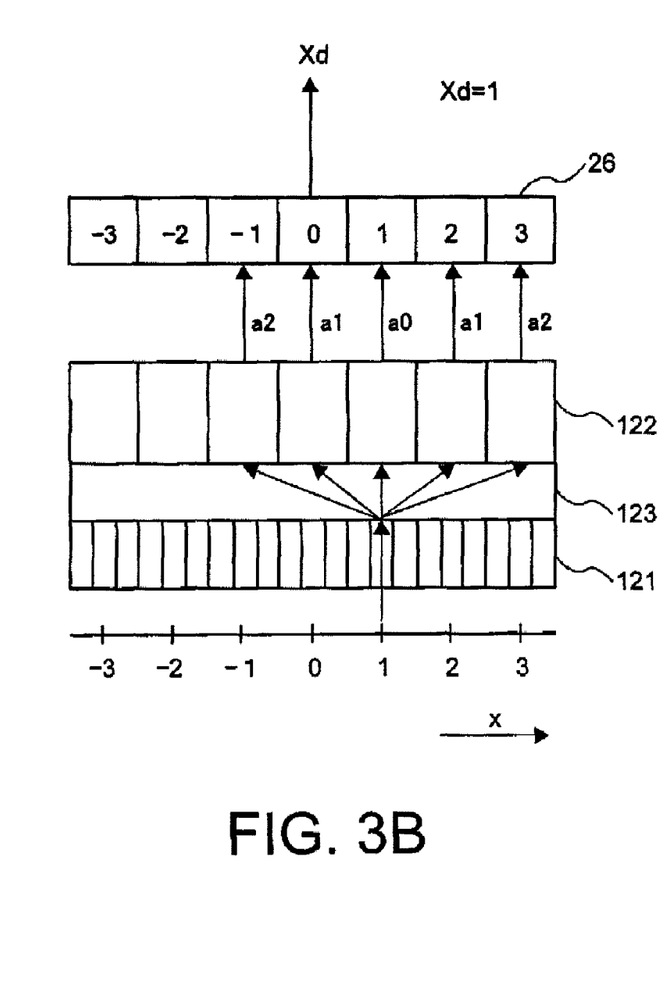

With reference to FIGS. 3A and 3B, signal composition unit 22 and detection position calculating unit 26 in each of data processing units 21-a and 21-b will be explained in more detail. In particular, it is the function of the data processing unit for processing detection signals supplied from multiplier photoelectron tubes 122 that are disposed in a ring-like arrangement direction are explained.

FIGS. 3A and 3B shows a construction of detector module 12-a in which each scintillator 121 being comprised of twenty-one Na (=21) elements optically coupled to multiplier photoelectron tube 122 being comprised of seven Nb(=7) elements through a light guide 123. Suppose that a gamma-ray radiated from an object 150 is detected at a center position of the scintillator 121 shown in FIG. 3A. In this case, a visible radiation generated from a scintillator 121 at a position zero x (x=0) is converted to electric signals in multiplier photoelectron tube 122 at plural positions, for example, at zero (x=0), at plus/minus one x (x=±1), and at plus/minus two x (x=±2) through light guide 123 and the converted signals are supplied to signal composition unit 22 and detection position calculating unit 26 in data processing unit 21-a.

In this case, sensitivity, i.e., amplitude, of a detection signal outputted from a multiplier photoelectron tube 122 depends on a propagation length of visible radiation that is propagated in a light guide 123. Thus, the propagation length becomes longer, the sensitivity becomes smaller. Accordingly, when the amplitude of a detection signal from multiplier photoelectron tube 122 at a zero x position (x=0) is indicated as a0 and the amplitudes of detection signals from multiplier photoelectron tube 122 at the positions at plus/minus one of x (x=±1) and plus/minus two of x (x=±2) are indicated as a1 and a2, respectively. And these relations become a0>a1>a2.

At this time, the amplitude Sg of a detection signal outputted from signal composition unit 22 is obtained by the following equation (1).

$$Sg = a0 + 2a1 + 2a2 \tag{1}$$

In the detection position calculating unit 26, by setting each of weighting functions of the detection signals corresponding to each positions at minus three to plus three of x (x=−3 to 3) as, for example, [−3, −2, −1, 0, 1, 2, 3] as depicted in FIG. 3A. It becomes possible to calculate gamma-ray detection at a position Xd=0, i.e., at a center portion of the scintillator 121, from the following equation (2).

$$Xd = \frac{-2a2 - a1 + 0 + a1 + 2a2}{Sg} = 0 \tag{2}$$

On the other hand, as shown in FIG. 3B, when a gamma-ray is detected by the scintillator 121 at a position of x=1, the visible radiations generated from the scintillator 121 though the light guide 123 are converted to electric signals in the multiplier photoelectron tubes 122 provided, for example, at positions of x=−1 to 3, and supplied to signal composition unit 22 and detection position calculating unit 26 in the data processing unit 2.

At this time, the amplitude Sg of the compounded detection signal supplied from the signal composition unit 22 is acquired by the above-mentioned equation (1). In the detection position calculating unit 26, gamma-ray detection position of Xd=1 is calculated from the following formula (3).

$$Xd = \frac{-a2 + 0 + a0 + 2a1 + 3a2}{Sg} = 1 \tag{3}$$

As explained above, it becomes possible to accurately calculate gamma-ray detection positions based on the detection signals acquired from a plurality of adjoining multiplier photoelectron tubes 122. In this embodiment, each gamma-ray detection position is calculated in a ring-like arrangement direction by using scintillator 121 and multiplier photoelectron tube 122 in the detector modules 12 provided in a ring-like arrangement direction 12. Of course, it is possible to calculate detection positions in a body axis direction based on the detection signals obtained from scintillator 121 and multiplier photoelectron tube 122 provided in the body axis direction.

Turning to FIG. 1, each wave height discriminator 23 in the data processing units 21-a and 21-b includes a memory circuit (not shown) and a comparison circuit (not shown). The memory circuit wave in the height discriminator 23 preliminarily stores a threshold value α. The threshold value α is used for discriminating detection signals from noises. The comparison circuit in the wave height discriminator 23 compares between the threshold value α and peak values of the detection signals supplied from signal composition unit 22. By the comparison, the detection signals having a larger peak value than the threshold value α are judged as the detection signals that are detected due to the original gamma-ray radiation.

Waveform shaping unit 24 in each of data processing unit generates a rectangular wave by amplifying each compounded detection signal outputted from signal composition unit 22. Then, detection time setting unit 25 measures a gamma-ray detection time based on a generation timing of, for example, at a front edge of the rectangular wave. Further, detection time setting unit 25 sets the gamma-ray detection time for discriminated detection signal at speak value discrimination unit 23.

Detection position setting unit 27 in each data processing unit sets up each gamma-ray detection position being calculated in detection position calculating unit 26 to each detection signal to which each gamma-ray detection time is added in detection time setting unit 25. Thus, each detection signal outputted from detection position setting unit 27 has added thereto the gamma-ray detection time and the gamma-ray detection position as affixed data. In this embodiment, data of gamma-ray detection position is added to each detection signal to which each gamma-ray detection time is added in the data processing unit. Of course, it is possible to add data of each gamma-ray detection time to each detection signal to which each gamma-ray detection position. Further it is possible to simultaneously add these data in the same unit.

As explained above, each data processing unit that is respectively connected to each detector module also includes a signal composition unit 22, a wave height discriminator 23, a waveform shaping unit 24, a detection time setting unit 25, a detection position calculating unit 26 and a detection position setting unit 27 in order to work as similarly as explained the above.

An incident direction calculating unit 3 in the nuclear medicine imaging apparatus 100 extracts each detection signal that is simultaneously measured at a predetermined detection time τ0 based on each gamma-ray detection time supplied from each of processing units 21-1 to 21 Nm. For instance, each detection signal based on a radioactive isotope S supplied from a pair of a first detector module 12-a and a second detector module 12-b is extracted. Each gamma-ray incident direction is calculated based on the gamma-ray detection position data affixed to these detection signals.

A projection data generating unit 4 in the nuclear medicine imaging apparatus 100 includes a memory circuit (not shown) in order to store a count value of each detection signal supplied from the incident direction calculating unit 3 so as to correspond to each of a gamma-ray detection position and a gamma-ray incident direction. Whenever detection of a gamma-ray is performed through the pair of the respective detector modules 12-a and 12-b, each count value of the detection signal is integrated in the memory circuit.

In a case that other detector modules detect a pair of gamma-rays, each gamma-ray detection position and each gamma-ray incident direction are designated by a similar method as explained above. Also, each count value of the detection signals is successively stored in the memory circuit with correspondence to the respective gamma-ray detection position and the gamma-ray incident direction. Thus, the memory circuit in the projection data generating unit 4 integrates each count value of the detection signals corresponding to the plurality of gamma-ray detection positions and the plurality of gamma-ray incident directions during a monitoring time period τf in order to generate monitoring data.

The projection data generating unit 4 further generates projection data by compounding a plurality of monitoring data that is acquired during a predetermined data collecting time period τx (τx>τf).

A projection data monitoring unit 5 in the nuclear medicine imaging apparatus 100 includes a memory circuit (not shown) and an operation circuit (not shown). The memory circuit stores a threshold value 8 in advance. The operation circuit calculates a body movement index ΔCx indicating influences due to body movements of an object by comparing each of two count values C of the monitoring data that have been acquired in two monitoring periods designated in adjoining times. When the body movement index ΔCx exceeds a threshold value β, an instruction signal is supplied to the system controlling unit 11 in order to generate an alarm signal.

In this case, the projection data monitoring unit 5 acquires a body movement index ΔCx by calculating a difference of the count values of each gamma-ray detection position and each gamma-ray incident direction at the two monitoring data. For instance, as illustrated in FIG. 4B, a body movement index ΔCx (Tm, Tm−1) derived from the count values C(Pi, θj, Zn, Tm) and C(Pi, θj, Zn, Tm−1) of the two dimensional monitoring data that are generated at one or plural cross sections being perpendicular to a body axis direction (z axis) centering on z=Zc is calculated by the following formula (4).

$$\Delta Cx(Tm, Tm-1) = \frac{\sqrt{\sum_i \sum_j \sum_n (C(Pi, \theta j, Zn, Tm) - C(Pi, \theta j, Zn, Tm-1))^2}}{\sum_i \sum_j \sum_n C(Pi, \theta j, Zn, Tm)} \quad (4)$$

Figure 4A:
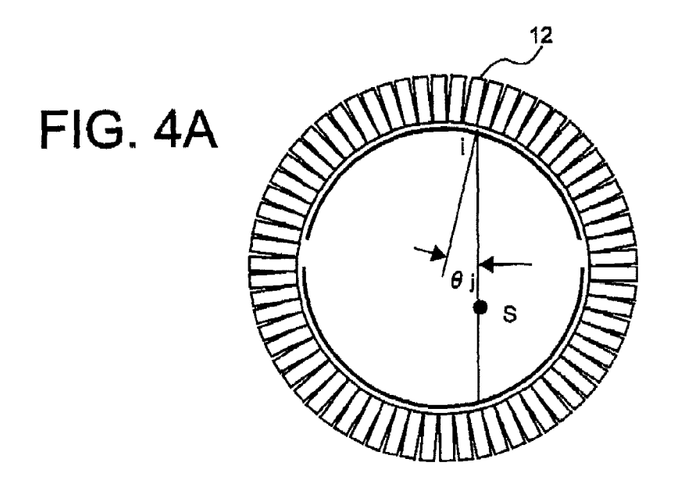
FIGS. 4A and 4B explain a body moving ratio calculation method in the embodiment shown in FIG. 1.
Figure 4B:
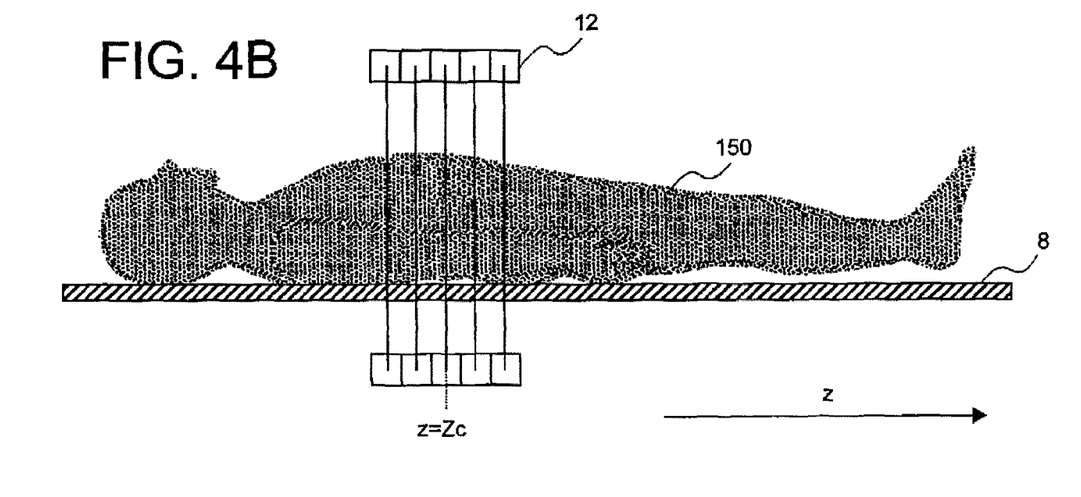

Here, Pi indicates a gamma-ray detection position at a detector module 12, and θj is a gamma-ray incident angle to a normal line of a scintillator surface at a detector module 12 as shown in FIG. 4A. Zn indicates a z-axis of monitoring data as shown in FIG. 4B. Tm and Tm−1 indicate monitoring periods [Tm−(Tm+1)] and [(Tm−1)−Tm=Tm−(Tm−1)=τf]. The detail of Tm and Tm−1 will be explained later in FIG. 7. Thus, according to the present invention, count values of gamma rays are stored in correspondence with gamma ray detection positions and gamma ray incident directions to a data detecting unit in order to calculate a difference between the count values of the gamma ray data collected in a first time period and a second time period against each of the detected position data. Based on the difference, the controller in the apparatus judges whether recollection of gamma ray detection data should be performed. According to the judgment, scanning control of repetition of data collection is executed.

Image data generating unit 6 in the nuclear medicine imaging apparatus 100 includes a operation circuit (not shown) and a memory circuit (not shown). Image data generating unit 6 generates image data by using projection data generated in projection data generating unit 4 at a data collecting time τx. Thus, based on gamma-ray detection positions in projection data, gamma-ray incident direction data and count values, the operation circuit performs, for example, a reverse projection process that is usually performed in an X-ray CT apparatus.

Further, depending upon necessity, it generates image data by performing signal processes such as a smoothing process and an interpolating process. The obtained image data are stored in the memory circuit.

A display unit 7 in the nuclear medicine imaging apparatus 100 includes a display data generation circuit (not shown), a conversion circuit (not shown) and a monitor (not shown). The displayed data generation circuit reads out image data generated by the image data generating unit 6 and generates displayed data by converting the read image data into a predetermined display format. The conversion circuit performs digital/analog (D/A) conversion and television (TV) format conversion of the displayed data. The acquired image signals are displayed on the monitor. Further, the system control unit 11 supplies an alarm signal so as to be displayed on the monitor based on a result of the comparison between the body movement index $\Delta Cx$ in the projection data monitoring unit 5 and a threshold value $\beta$.

A top plate 8 in the nuclear medicine imaging apparatus 100 is provided on an upper surface of a bed (not shown) so as to slide an object 150 lying on the plate in a predetermined distance along a body axis direction in order to set up a data detecting unit 1 on a particular diagnostic portion of the object. Further, a top plate/gantry driving mechanism unit 9 moves a top plate 8 or a gantry provided in the data detecting unit 1 in a desired direction or to a desired position in accordance with control signals supplied from the system control unit 11 so as to set up the data detecting unit 1 at the diagnostic portion.

By moving the top plate 8 or the data detecting unit 1 at predetermined distances so as to generate image data, it becomes possible to perform an inspection for a wide range of diagnostic areas of the object 150 in a short time. In this embodiment, it supposed that the image data of such a wide range are collected by moving the data detecting unit 1. Of course it is also possible to move the top plate 8 in order to collect wide range image data.

Figure 5:
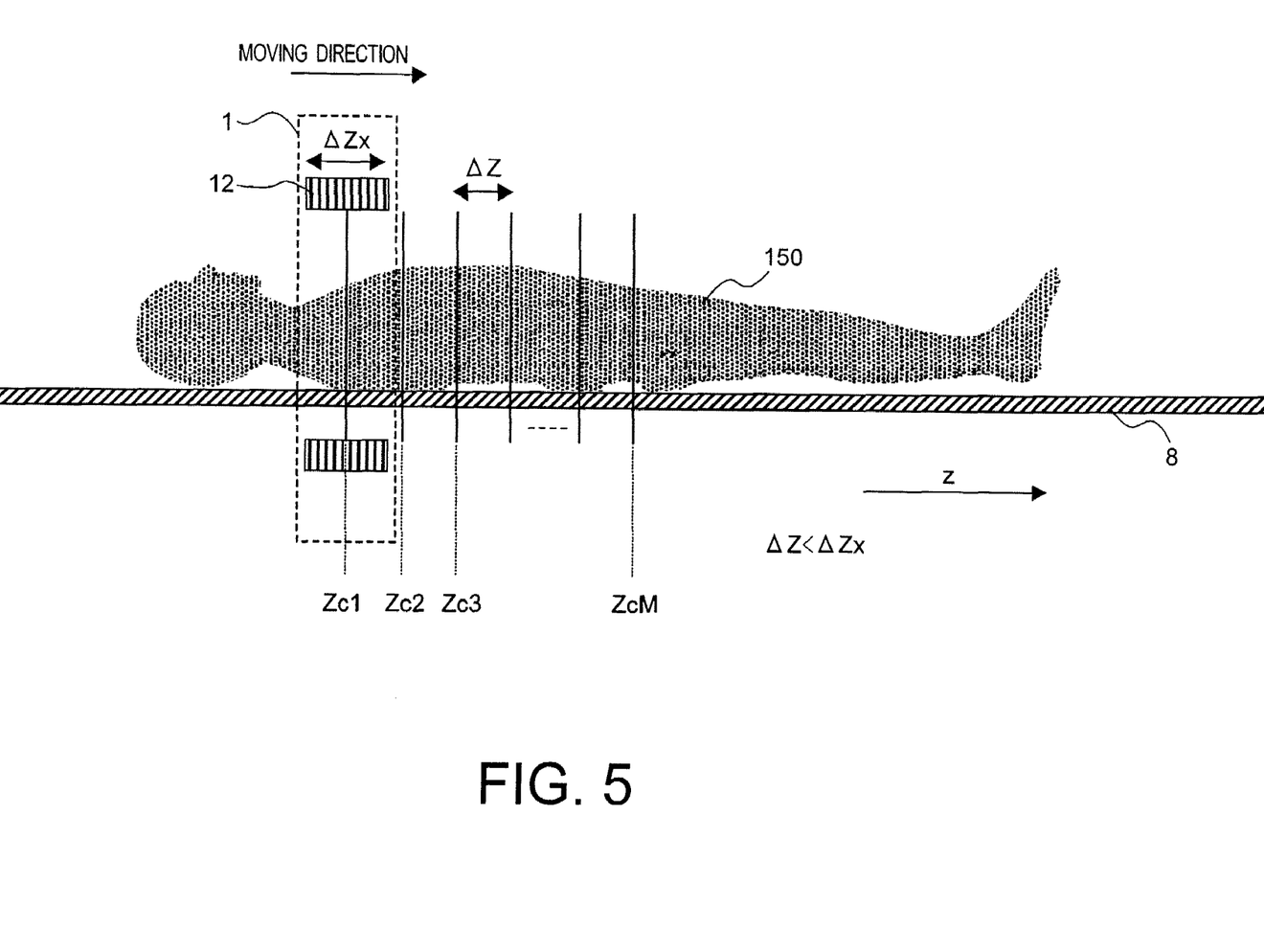
FIG. 5 shows a movement of a data detecting unit along a body axis in the embodiment shown in FIG. 1.

FIG. 5 illustrates how to move the data detecting unit 1 in a direction along a body axis Z of an object 150. As explained the above, a ring-like detector module 12 that is arrayed in one plane being perpendicular to a body axis direction is used to generate monitoring data and projection data so as to generate projection data for one cross-sectional image. As explained in FIG. 2, the plurality of detector modules 12-1 to 12-Nm provided in the data detecting unit 1 includes Na2 scintillators 121 and Nb2 multiplier photoelectron tubes 122 in the body axis direction, too. Consequently, it becomes possible to generate monitoring data and projection data that can generate a plurality of two dimensional image data or three dimensional image data (volume data) being perpendicular to the body axis direction in a short time.

Thus, in FIG. 5, when an initial setting of a center of the detector module 12 is carried out at a position z=Zc1 along the body axis direction z, generation of monitoring data and projection data in a scope $\Delta Zx$ centering on z=Zc1, i.e., an arrangement scope of scintillators 121 and multiplier photoelectron tubes 122 shown in FIG. 2, will be performed in the substantially same time.

In this case, since a pair of gamma-rays detected by the detector module 12 is not limited to a plane being perpendicular to the body axis direction but also a slant plane, it becomes possible to generate three dimensional projection data.

Next, the top plate/gantry driving mechanism unit 9 is successively moved in a predetermined moving scope $\Delta Z$ keeping a center of the detector module 12 between positions z=Zc2 to ZcM in order to generate monitoring data and projection data at each center position of the range $\Delta Zx$. Accordingly, by moving the data detecting unit 1 along the body axis direction of the object 150, it can successively generate image data in a wide range of the diagnostic portion. In order to prevent missing image data in a body axis direction, the moving scope $\Delta Z$ is usually set up so as to be $\Delta Z<\Delta Zx$.

An input unit 10 in the nuclear medicine imaging apparatus 100 is an interactive interface including input devices, such as a keyboard, a track ball, a joy stick and a mouse, and also including a display panel or various switches. Through the input unit 10, various setting up operations are performed. Thus, setting up operations of projection data generating conditions, such as input of an object data, a data collecting time $\tau x$, monitoring a data collecting time $\tau f$, and a moving scope of data detecting unit 1 along a body axis direction are performed. Further, setting up of an initial position (z=Zc1) of the data detecting unit 1 against an object 150 and input operations of command signals for starting generation of projection data or command signal for starting repetition also are performed through the input.

A system control unit 11 in nuclear medicine imaging apparatus 100 includes a central processing unit (CPU) and a memory circuit (not shown). The system control unit 11 stores input data or setting data supplied from the input unit 10 to the memory circuit, and generates and displays image data based on the input data by controlling each unit in the apparatus. Further if the body movement index $\Delta Cx$ calculated by the projection data monitoring unit 5 exceeds a threshold value 6, an alarm signal is supplied to the display unit 7.

With reference to a flowchart in FIG. 6, image data generation steps consistent with this embodiment will be explained.

Prior to generation of image data, an operator injects a radioactive isotope (RI) to an object 150. As an RI, a compound being marked with positron emission nuclides, such as $^{11}C$, $^{13}N$, $^{15}O$ and $^{18}F$, is used (step S1). After passing a predetermined time from the RI injection, the object 150 with an RI is placed on top plate 8 (step S2).

An operator I puts object data, a monitoring time $\tau f$, a data collecting time $\tau x$, and sets up other projection data generating conditions, such as a moving amount of the data detecting unit 1 along a body axis direction through the input unit 10. Then, a center of the data detecting unit 1 along the body axis direction is set up at a first diagnosis position of the object 150, as illustrated at a position of z=Zc1 in FIG. 5 (step S3). The inputted data or set up data through the input unit 10 are stored in a memory circuit in the system control unit 11.

When the above-explained initial setting up operations are finished, the operator inputs a command for starting generation of projection data through the input unit 10 (step S4). When this command signal is supplied to the system controlling unit 11, an operation to generate projection data at a position of z=Zc1 is started.

Accordingly, the plurality of detector modules 12-1 to 12-Nm of the data detecting unit 1 provided surrounding the object 150 detects a pair of gamma-ray of the radioactive isotope successively emitted from a body of the object with RI. The detected gamma-rays are converted into detection signals of Nb 3 channels and supplied to a signal composition unit 22 and a detection position calculating unit 26 in data processing units 21-1 to 21-Nm of the data processing unit 2.

The signal composition unit 22 composes signals by adding detection signals of Nb 3 channel supplied from each of the detector modules 12-1 to 12-Nm. The composed detection signals are supplied to a wave height discriminator 23 and a waveform shaping unit 24, respectively. The wave height discriminator 23 discriminates noise by comparing the supplied detection signals and a predetermined threshold value α. The waveform shaping unit 24 shapes the detection signals into rectangular waves.

The detection time setting unit 25 measures a gamma-ray detection time in the data detecting unit 1 based on a timing of a front edge of a rectangular wave supplied from the waveform shaping unit 24. Further, the detection time setting unit 25 adds the gamma-ray detection time to the detection signals that are discriminated in the wave height discriminator 23.

The detection position calculating unit 26 that received detection signals of Nb3 channels from the detector modules 12-1 to 12-Nm calculates gamma-ray detection positions in the data detecting unit 1 by the method as explained in FIG. 3. The detection position setting unit 27 adds gamma-ray detection position data supplied from the detection position calculating unit 26 to detection signals provided from the detection time setting unit 25 and supplies detection signals having data of a gamma-ray detection time and a gamma-ray detection position to the incident direction calculating unit 3.

The incident direction calculating unit 3 that is supplied the detection signals from each of data processing units 21-1 to 21-Nm corresponding to each of detector modules 12-1 to 12-Nm extracts detection signals during the same detection time $\tau 0$ based on gamma-ray detection time data affixed to the detection signals. Further, a gamma-ray incident direction is calculated based on gamma-ray detection position data affixed to these detection signals.

Next, the projection data generating unit 4 sets up a first monitoring period [T1–T2] (T2–T1=$\tau f$) that has a predetermined monitoring time ($\tau 0 \ll \tau f$). Further, the projection data generating unit 4 stores count values of the detection signals successively supplied through the incident direction calculating unit 3 during the first monitoring period corresponding to each gamma-ray detection position and gamma-ray incident direction in the memory circuit in unit 4 so as to generate the first monitoring data (FIG. 6, step S5).

When the generation of the first monitoring data has completed, the second monitoring data are generated at the second monitoring period [T2--T3] (T3–T2=$\tau f$) succeeding the first monitoring period.

Figure 6:
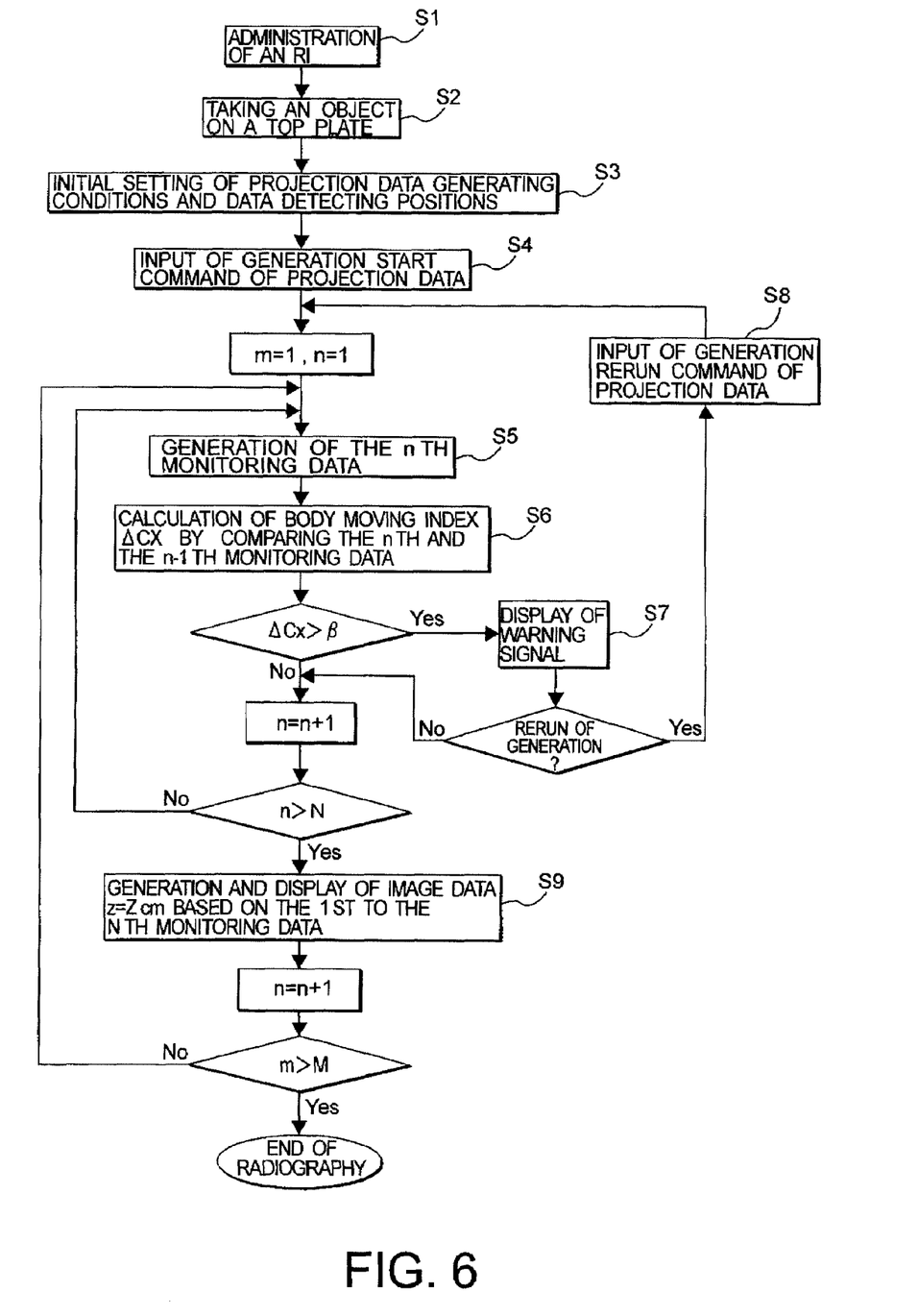
FIG. 6 is a flowchart for showing an image data generation process in an embodiment consistent with the present invention.

Then the projection data monitoring unit 5 calculates a body movement index $\Delta Cx$ that indicates body movement of the object using the count values in the first monitoring data and the second monitoring data to, for example, the formula (4) (FIG. 6, step S6).

When the acquired body movement index $\Delta Cx$ exceeds a preliminary determined threshold value β, a result of the comparison is supplied to the system control unit 11. System control unit 11 generates an alarm signal based on the comparison result and displays the alarm on a display unit 7 (FIG. 6, step S7).

An operator who observes the alarm signal judges whether or not generation of projection data should be restarted. When he decides to restart the generation, a command for restarting generation of projection data is input through the input unit 10 (step S8). The system control unit 11 receives this command signal controls each units in the nuclear medicine imaging apparatus 100 so as to restart generation of monitoring data from the first monitoring period [T1–T2].

In other cases that a command for restarting the generation of projection data is not input by an operator, or that a calculated body movement index $\Delta Cx$ at the step S6 in FIG. 6 is smaller than a threshold value β, a third generation of monitoring data at a third monitoring period [T3–T4] is executed A body movement index $\Delta Cx$ calculated based on a count value of the third monitoring data and a count value of the second monitoring data is compared with the threshold value β. Based on a result of the comparison, an alarm signal may be displayed (FIG. 6, steps S5 to S7)

Such a procedure is restarted up to a generation of monitoring data at a predetermined Nth monitoring period [TN–T(N+1)]. During the repetition of the generation of monitoring data, if an operator inputs a command for restarting the generation of projection data for the above-explained reasons, generation of monitoring data is restarted by returning to the first monitoring period [T1–T2] (FIG. 6, steps S5 to S8).

On the other hand, when the generation of projection data for the first monitoring data up to for the Nth monitoring data is completed without inputting a command for repetition, the projection data generating unit 4 generates projection data by compounding these monitoring data. The projection data is supplied to the image data generating unit 6. In this case, projection data equivalent to the projection data generated at a data collecting time $\tau x$ ($\tau x = N \tau f$) is generated.

The image data generating unit 6 performs a reconstruction process of the projection data so as to generate image data for display on the display unit 7 (FIG. 6, step S9).

As illustrated in FIG. 2, in a case that a plurality of scintillators 121 and a plurality of multiplier photoelectron tubes 122 are arrayed along a body axis direction, it is possible to generate a plurality of image data perpendicular to the body axis at a near position to z=Zc1.

Figure 7:
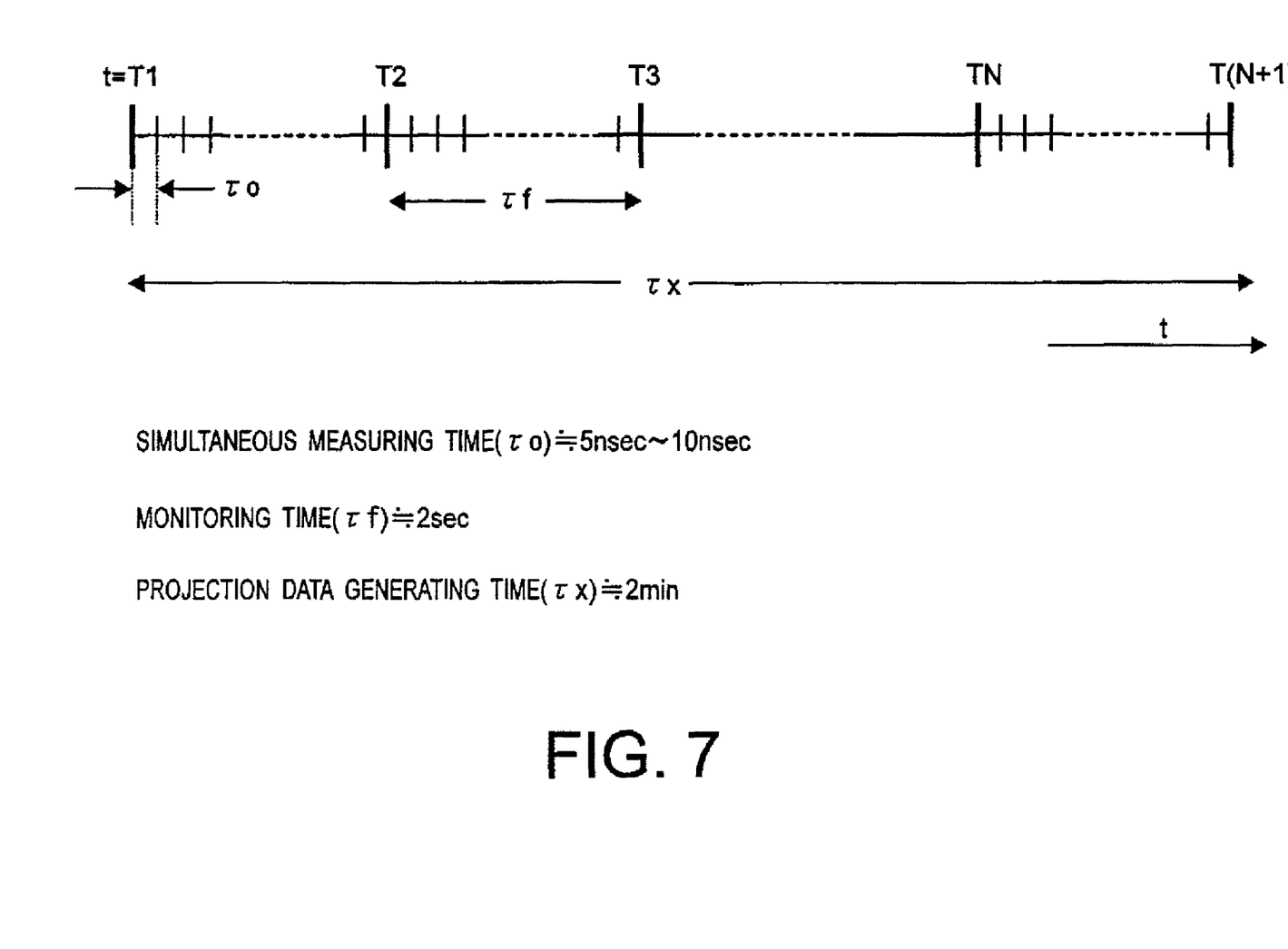
FIG. 7 shows the first to the Nth monitoring periods in the embodiment shown in FIG. 6 and a plurality of simultaneous detection times being set in each of these monitoring periods.

FIG. 7 shows the first monitoring period [T1–T2], the second monitoring period [T2–T3], - - - , and the Nth monitoring period [TN–T(N+1)] for generating the first to the Nth monitoring data. The respective size of each monitoring period is determined by an initially set up monitoring time $\tau f$. During in each of these monitoring periods, a plurality of measuring periods having a simultaneous detection time $\tau 0$ is substantially continuously set up. In each of these measuring periods, a detection signal due to a pair of gamma-rays emitted from the same positron nuclide is extracted.

Typical values of the above-explained same detection time $\tau 0$, monitoring time $\tau f$ and data collecting time $\tau x$ are 5n to 10n seconds, two seconds and two minutes, respectively. Thus, during generation of one projection data, it can generate about sixty monitoring data.

In the above-explained procedure, when generation of image data at a position of z=Zc1 and display of the image data are finished, generation and display of image data at each position of z=Zc2 to ZcM by moving the data detecting unit 1 along the body axis direction at a predetermined interval $\Delta Z$ are performed. Normally, a number M of the moving steps of the data detecting unit 1 is about ten (10).

According to the above-mentioned embodiments consistent to the present invention, when projection data is generated based on a count value of gamma-ray emitted from an object which is administered with a radioactive isotope, it becomes possible to detect body movement of the object by monitoring changes of the count values measured during a predetermined time. If non-permissive body movement has occurred, generation of projection data can be restarted at early stages. Consequently, while inspection efficiency can improve, the physical burden for an object or an operator can be reduced.

Especially, such non-permissive body movement has occurred even when an object is administered with a radioactive isotope having a relatively shorter radioactive half-life, the time required to restart generation of projection data can reduced. Accordingly, the possibility of increasing the amount of contamination accompanying re-administration can be reduced.

According to the embodiments consistent with the present invention, a plurality of successive monitoring periods during the generation period of projection data is set up and a count value of monitoring data generated in an adjoining monitoring period is successively compared so as to detect body movement of an object.

Further, according to this embodiment consistent with the present invention, since the influence of the body movement of an object is determined by using a body movement index calculated based on count values of monitoring data acquired from adjoining monitoring periods, it becomes possible for an operator to judge repetition of generation of projection data objectively and correctly without depending upon past experiences.

Moreover, since the projection data used in a reconstruction process for aiming generation of image data can be generated by compounding monitoring data that are generated in a plurality of monitoring periods, the projection data can be efficiently generated.

Figure 8:
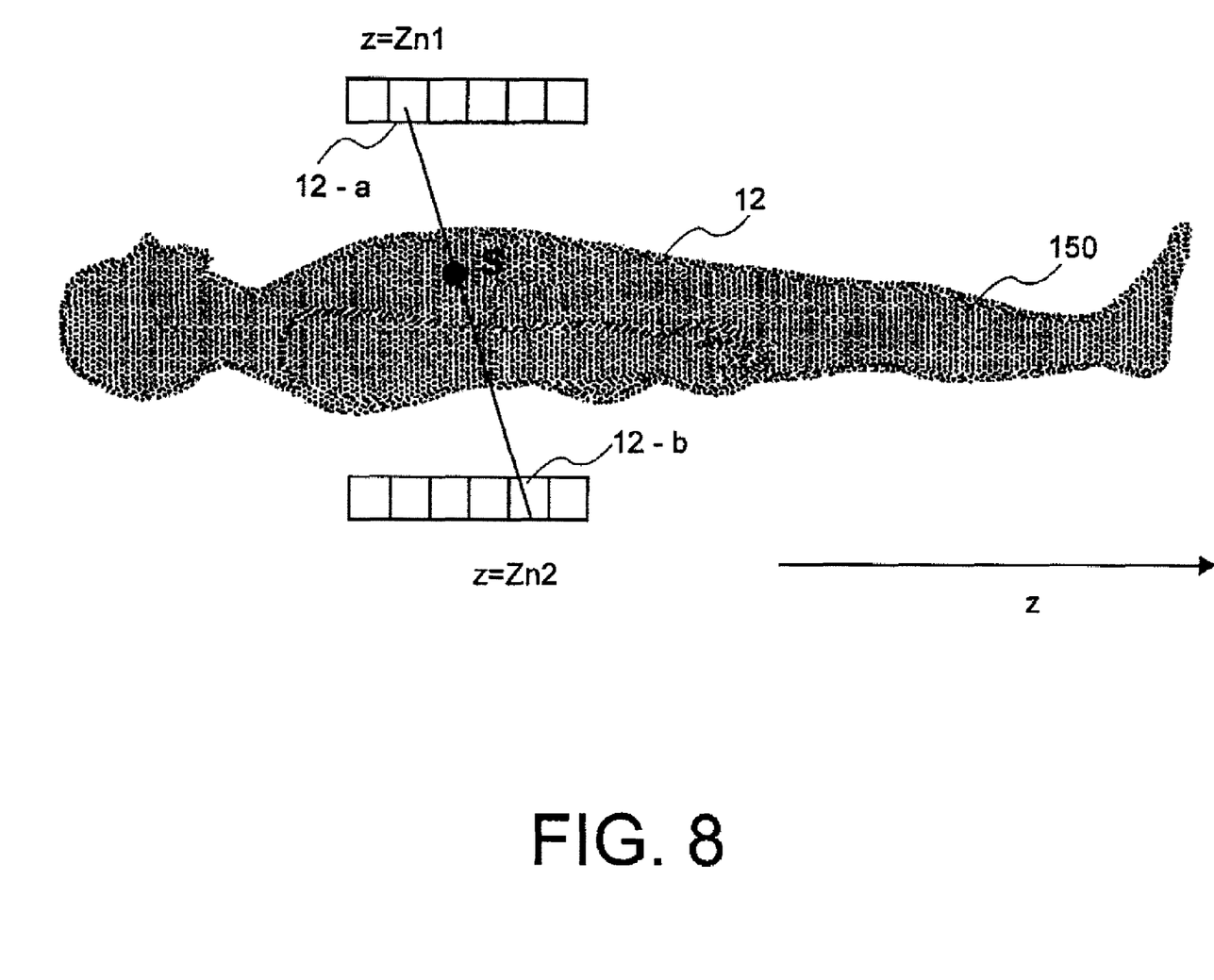
FIG. 8 illustrates a modification of body moving ratio calculation method in the embodiment shown in FIG. 6.

While the embodiments consistent to the present invention have been explained as mentioned above, the invention does not limited to the explained embodiments only, but it is possible to carry out the invention through modification. For instance, while the formula (4) in the above-explained embodiment calculates a body movement index $\Delta Cx$ when one or plural image data being perpendicular to a body axis direction are generated, a body movement index $\Delta Cx$ for generating three dimensional volume data can be calculated using the following formula (5). Here, as shown in FIG. 8, Zn1 and Zn2 indicate z coordinates of detector modules 12-1 and 12-b by which a pair of gamma-rays is detected, and Zn1≠Zn2 indicates that these detector modules 12-a and 12-b do not exist on the same plane being perpendicular to the body axis.

$$\Delta Cx(Tm, Tm-1) = \frac{\sqrt{\sum_i \sum_j \sum_{n1} \sum_{n2} (C(Pi, \theta j, Zn1, Zn2, Tm) - C(Pi, \theta j, Zn1, Zn2, Tm+1))^2}}{\sum_i \sum_j \sum_{n1} \sum_{n2} C(Pi, \theta j, Zn1, Zn2, Tm)} \quad (5)$$

In the above-mentioned embodiment, to generate image data for a wide diagnosis area of an object 150, the data detecting unit 1 is moved together with a gantry along a body axis direction. Of course, it is possible to move the top plate 8 in an opposite direction instead of moving the data detecting unit 1.

In the above-mentioned embodiment, repetition of projection data is performed based on a command signal that is inputted by an operator after observing an alarm signal displayed on a display unit when a body movement index $\Delta Cx$ exceeds a threshold value $\beta$. The system according to the invention can also automatically perform repetition of projection data generation based on a result of comparison between a body movement index $\Delta Cx$ and a threshold value $\beta$. In the above-described embodiment, the repetition of projection data is always performed from a position z=ZXc1. However, the starting point is not limited to such a position but can be performed at any position when a non-permissible body movement has occurred.

The present invention is also not limited to displaying an alarm signal on a monitor in a display unit 7 but it is also possible to display the alarm signal on a display of an input unit 10. Further it is possible to inform an operator of an alarm condition by a voice supplied from an audio output unit that is separately provided.

In the explanation of the embodiment, the data detecting unit 1 has previously stored a threshold value $\alpha$, a threshold value $\beta$, the same detection time $\tau 0$ and a body axis direction moving scope $\Delta Z$. These values, of course, may also be initially be set by an input unit 10 similar to the data collecting time $\tau x$ and monitoring time $\tau f$.

The image data generation from projection data through a reconstruction process can be collectively performed at a time when projection data has been generated at each position of z=Zc1 to ZcM. It is, of course, possible to generate image data from projection data at each of the positions. In the formula (4) and the formula (5), a body movement index $\Delta Cx$ is calculated by using all projection data obtained in an area $\Delta Zx$. It is also possible to calculate the body movement index by using arbitrary projection data at one or plural cross-sections being perpendicular to a body axis direction.

It is desirable to calculate a gamma-ray detection position and a gamma-ray incident direction for each of scintillators 121 that are provided in a strip-like configuration in a detection module 12. Of course it is also possible to calculate them for a group of scintillators 121.

To calculate the body movement index $\Delta Cx$, two monitoring periods need not be strictly adjoining. It is also permissible to compare projection data that are acquired, for example at two nonadjoining periods, such as monitoring period [T1–T2] and monitoring period [T3–T4] (T2≠T3).

Other embodiments consistent with the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A positron emission computer tomography (PET) imaging apparatus including a detector configured to detect gamma-rays emitted from a predetermined diagnosis portion of an object containing a radioactive isotope, and an image generation unit configured to generate an image of the radioactive isotope from the object based on the detected gamma-rays, the PET imaging apparatus further comprising:
 a direction calculating unit configured to acquire incident directions of the gamma rays to the detector based on the detected gamma-rays;
 a first counting unit configured to acquire first count values of the gamma rays for each detecting position of the detector and each incident direction in a first time period;
 a second counting unit configured to acquire second count values of the gamma rays for each detecting position of the detector and each incident direction in a second time period; and
 a judging unit configured to judge whether a movement of the object has occurred based on differences between the first count values and the second count values at respective detecting positions and incident directions.

2. The PET imaging apparatus according to claim 1, further comprising a scanning control unit configured to perform repetition of data collection when the judging unit judges that movement has occurred.

3. The PET imaging apparatus according to claim 1, further comprising a scanning control unit configured to display a message asking whether data collection should be restarted when the judging unit judges that movement has occurred.

4. The PET imaging apparatus according to claim 1 configured to perform data collection in a plurality of areas of the object by intermittently moving the object; and further comprising a scanning control unit configured to perform repetition of data collection when the judging unit judges that movement has occurred.

5. The PET imaging apparatus according to claim 1 configured to perform data collection in a plurality of areas of the object by intermittently moving the object; further comprising a scanning control unit configured to display a message asking whether data collection should be restarted when the judging unit judges that movement has occurred.

6. The PET imaging apparatus according to claim 1, wherein the judging unit is configured to determine a movement index $\Delta Cx(Tm, Tm-1)$ as $$\sqrt{\frac{\sum_i \sum_j \sum_n (C(Pi, \theta j, Zn, Tm) - C(Pi, \theta j, Zn, Tm-1))^2}{\sum_i \sum_j \sum_n C(Pi, \theta j, Zn, Tm)}}$$

where Pi is a detection position, $\theta j$ is a gamma ray incident angle, Zn is z-axis monitoring data, Tm is the second time period and Tm-1 is the first time period.

7. A PET imaging apparatus configured to detect gamma rays emitted from a predetermined portion of an object containing a radioactive isotope, and configured to generate an image of the radioactive isotope in the object based on the detected gamma rays, the PET imaging apparatus comprising:
- a judging unit judging whether or not movement of the object has occurred based on count values of the detected gamma rays at detecting positions and count values of incident directions of the detected gamma rays; and
- a scanning control unit configured to perform at least one of a repetition of data collection and display of a message asking whether or not the repetition of data collection should be performed when the judging unit judges that movement has occurred.

8. A method for generating image data for a PET imaging apparatus, comprising:
- detecting gamma rays emitted from a predetermined diagnosis portion of an object containing a radioisotope;
- calculating an incident direction of each of a plurality of gamma rays to a detector based on the detected gamma rays;
- acquiring first count values of gamma rays for the respective incident directions to the detector during a first time period;
- acquiring second count values of gamma rays for the respective incident directions to the detector during a second time period;
- judging whether movement of the object has occurred based on a difference between the first count values and the second count values at respective detecting positions and incident directions; and
- generating an image of the radioisotope in the object based on the judging.

9. A positron emission computer tomography (PET) imaging apparatus, comprising:
- a data detecting unit configured to detect gamma-rays emitted from a predetermined diagnosis portion of an object containing a radioactive isotope;
- a detected position calculating unit configured to calculate a detected position of a gamma-ray on the detecting unit;
- an incident direction calculating unit configured to calculate an incident direction of a gamma-ray on the detecting unit;
- a projection data generating unit configured to generate a plurality of projection data in time sequence by storing count values of detected gamma-ray signals acquired through the data detecting unit in correspondence to each of the gamma-ray detecting positions and the gamma-ray incident directions, respectively, and determining differences in the count values stored at two different times at respective detecting positions and incident directions;
- a projection data control unit configured to control repetition of generating projection data of a predetermined diagnosis portion of an object based on a result of the projection generating unit; and
- an image data generating unit configured to display gamma-ray image data by reproducing the projection data based on the plurality of projection data acquired by the repetition of generating projection data.

10. The PET imaging apparatus according to claim 9, wherein:
the projection data generating unit generates a plurality of projection data based on the count values of the gamma-ray detected signals in the projection data generated in a time sequence in the projection data generating unit.

11. The PET imaging apparatus according to claim 9, wherein:
the projection data generating unit generates a command signal for repeating generation of the projection data based on time variations of count values at the projection data generated during a time sequence from the projection data generating unit.

12. The PET imaging apparatus according to claim 9, wherein:
the projection data generating control unit calculates a movement index based on time variations of count values using projection data generated in a time sequence by the projection data generating unit and generates a command signal for repeating generation of the projection data.

13. The PET imaging apparatus according to claim 12, further comprising an input unit; and wherein the projection data generating unit controls repetition of the generation of the projection data based on the command signal.

14. The PET imaging apparatus according to claim 12, wherein:
the projection data generating control unit controls repetition of the projection data based on the command signal.

15. The PET imaging apparatus according to claim 9, wherein:
the projection data generating unit generates projection data by composing the plurality of projection data acquired during the repetition.

16. An image data generating method, comprising:
- a detecting step configured to detect gamma rays emitted from a predetermined diagnosis portion of an object containing a radioisotope through a data detector;
- a calculating step configured to calculate gamma ray detected positions and gamma ray incident directions in a detected position calculating unit and in an incident direction calculating unit, respectively;
- a generating step configured to generate a plurality of projection data in a time sequence through a projection data generating unit including storing count values of the detected signals acquired through the data detector for a predetermined period in correspondence to each of the gamma ray detected positions and the gamma ray incident directions, respectively, and determining differences between two count values at two different times at respective detecting positions and incident directions;

a repeating step configured to repeat generation of the projection data of a predetermined diagnosis portion of the object based on a result of the projection data generating unit through a projection data generating control unit;

a generating step configured to generate projection data based on the plurality of projection data that are acquired through repetition by the projection data generating unit; and a generating step configured to generate image data by performing a reproduction of the projection data by an image data generating unit.

17. In a nuclear medicine imaging apparatus including a detector configured to detect gamma rays emitted from a predetermined diagnosis portion of an object containing a radioisotope; and an image generating unit configured to generate an image of the radioisotope in the object based on the detected gamma rays, the nuclear medicine imaging apparatus further comprising:

a storing unit configured to store count values of the gamma rays in correspondence with respective detected positions and incident directions of the gamma rays; and a control unit configured to acquire differences between first count values generated from gamma rays collected in a first time period and second count values generated from gamma rays collected in a second time period at respective detecting positions and incident directions of the gamma rays and to judge whether a recollection of gamma rays should be performed.

18. A positron emission computer tomography imaging apparatus comprising:

a gamma ray detector;

a direction calculating unit configured to acquire incident directions of gamma rays emitted from an object containing a radioisotope to the detector;

a first counting unit configured to acquire first count values of gamma rays detected in a first time period;

a second counting unit configured to acquire second count values gamma rays detected in a second time period; and a judging unit configured to judge whether movement of the object has occurred based on differences between the first count values and the second count values at respective detecting positions of the detector and incident directions.

19. An apparatus according to claim 18, comprising:

said judging unit configured to repeat detecting of gamma rays when movement of the object was judged to have occurred.

20. A method according to claim 19, comprising:

determining whether to repeat the detecting, calculating and acquiring steps based upon the judging step.

21. A method of operating a positron emission computer tomography imaging apparatus, comprising:

detecting gamma rays emitted from a predetermined diagnosis portion of an object containing a radioisotope;

calculating an incident direction of each of a plurality of detected gamma rays;

acquiring first count values of gamma rays for the respective incident directions during a first time period;

acquiring second count values of gamma rays for the respective incident directions during a second time period; and judging whether movement of the object has occurred based on a difference between the first count value and the second count value at respective detecting positions and incident directions.

* * * * *